(12) United States Patent
Frederick et al.

(10) Patent No.: US 9,616,831 B2
(45) Date of Patent: Apr. 11, 2017

(54) BUMPER ASSEMBLIES INCLUDING VERTICAL RIGIDITY FLANGE

(71) Applicant: Toyota Motor Engineering & Manufacturing North America, Inc., Erlanger, KY (US)

(72) Inventors: Scott L. Frederick, Brighton, MI (US); Manpreet Singh, Battle Creek, MI (US); Matthew A. Jansma, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 4 days.

(21) Appl. No.: 14/674,803

(22) Filed: Mar. 31, 2015

(65) Prior Publication Data

US 2016/0200272 A1    Jul. 14, 2016

Related U.S. Application Data

(60) Provisional application No. 62/101,747, filed on Jan. 9, 2015.

(51) Int. Cl.
*B60R 19/18* (2006.01)
*B60R 19/02* (2006.01)

(52) U.S. Cl.
CPC ............ *B60R 19/18* (2013.01); *B60R 19/023* (2013.01); *B60R 2019/186* (2013.01); *B60R 2019/1893* (2013.01)

(58) Field of Classification Search
CPC .................. B60R 19/18; B60R 19/023; B60R 2019/1893; B60R 2019/186
USPC .......................................................... 293/120
See application file for complete search history.

(56) References Cited

U.S. PATENT DOCUMENTS

| | | | |
|---|---|---|---|
| 6,971,691 B1* | 12/2005 | Heatherington | ........ B60R 19/18 293/102 |
| 6,997,490 B2 | 2/2006 | Evans et al. | |
| 7,222,896 B2 | 5/2007 | Evans | |
| 7,390,038 B2 | 6/2008 | Campbell et al. | |
| 8,191,959 B2 | 6/2012 | Ritz | |
| 2008/0277951 A1 | 11/2008 | Rathje et al. | |
| 2013/0313841 A1* | 11/2013 | Mana | ...................... B60R 19/18 293/136 |

* cited by examiner

*Primary Examiner* — Joseph D Pape
*Assistant Examiner* — Dana Ivey
(74) *Attorney, Agent, or Firm* — Dinsmore & Shohl LLP

(57) ABSTRACT

A bumper assembly includes a bumper upper member that is reinforced in a vehicle vertical direction against a bumper energy absorber structure. The bumper upper member includes a vertical rigidity flange that extends outwardly toward the bumper energy absorber that limits movement of the bumper upper member in response to a downward vertical force, which can improve static subjective rigidity, while maintaining pedestrian performance.

20 Claims, 5 Drawing Sheets

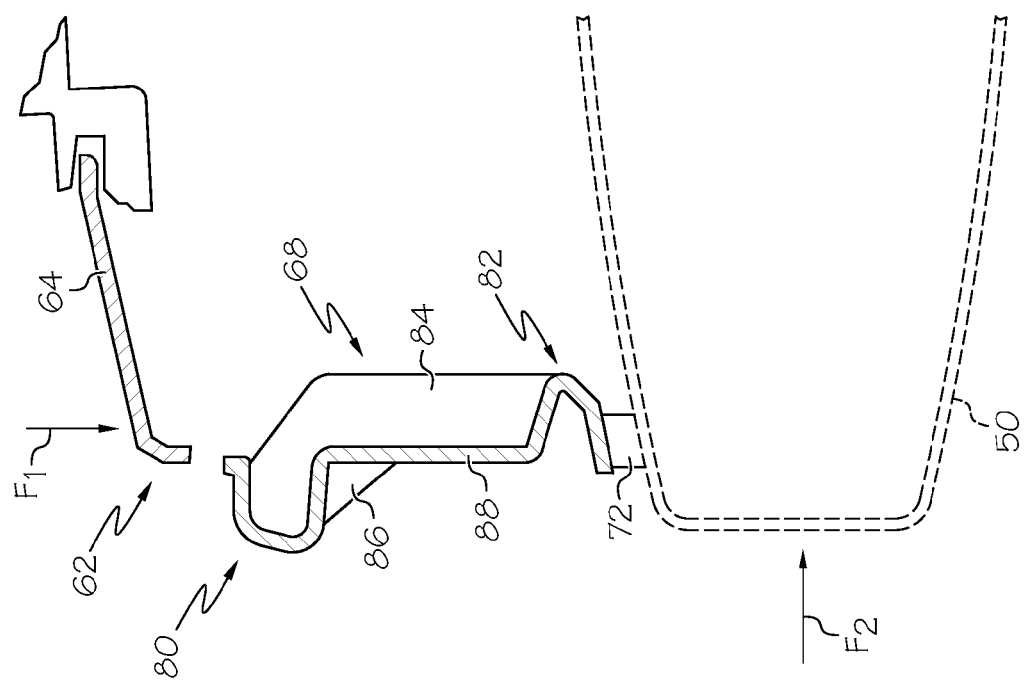
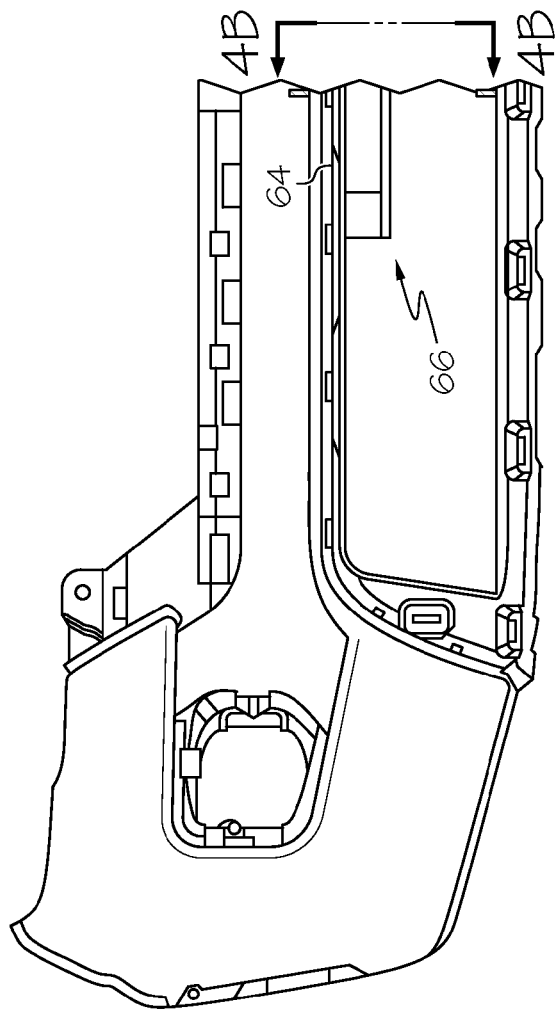

BUMPER ASSEMBLIES INCLUDING VERTICAL RIGIDITY FLANGE

CROSS-REFERENCE TO RELATED APPLICATIONS

This application claims the benefit of priority to U.S. Provisional Application No. 62/101,747, titled "Bumper Assemblies Including Vertical Rigidity Flange," filed Jan. 9, 2015, the details of which are incorporated herein by reference in their entirety.

TECHNICAL FIELD

The present specification generally relates to bumper assemblies and vehicles that include bumper assemblies, and more specifically, bumper assemblies that include a vertical rigidity flange.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Such criteria can affect the rigidity or feel of the bumper assemblies. Accordingly, bumper assemblies are desired that allow for static subjective rigidity, particularly in the vertical direction, while maintaining pedestrian performance.

SUMMARY

In one embodiment, a bumper assembly includes a bumper upper member that is reinforced in a vehicle vertical direction against a bumper energy absorber structure. The bumper upper member includes a vertical rigidity flange that extends outwardly toward the bumper energy absorber that limits movement of the bumper upper member in response to a downward vertical force, which can improve static subjective rigidity, while maintaining pedestrian performance.

In another embodiment, a vehicle includes a bumper assembly including a bumper reinforcement beam that extends generally in a vehicle lateral direction. A bumper energy absorber member is connected to the bumper reinforcement beam and extends outwardly in a vehicle longitudinal direction toward a bumper fascia. An upper bumper member extends in the vehicle lateral direction above the bumper energy absorber. The upper bumper member includes an upper bumper support that extends in the vehicle lateral direction along a length of the bumper energy absorber member. A vertical rigidity flange extends outwardly from the upper bumper support and spanning a gap between the upper bumper support and bumper energy absorber member. The bumper energy absorber member supports the vertical rigidity flange in a vehicle vertical direction.

In another embodiment, an upper bumper member that extends in a vehicle lateral direction above a bumper energy absorber includes an upper bumper support that is configured to extend in the vehicle lateral direction along a length of the bumper energy absorber member. A vertical rigidity flange extends outwardly from the upper bumper support and is configured to span a gap between the upper bumper support and bumper energy absorber member to support the upper bumper support in a vehicle vertical direction on the bumper energy absorber member.

In another embodiment, a method of providing bumper rigidity includes providing an upper bumper member that extends in the vehicle lateral direction above a bumper energy absorber. The upper bumper member includes an upper bumper support that extends in the vehicle lateral direction along a length of the bumper energy absorber member. A vertical rigidity flange extends outwardly from the upper bumper support and spans a gap between the upper bumper support and bumper energy absorber member. The bumper energy absorber member supporting the vertical rigidity flange on the bumper energy absorber member in a vehicle vertical direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A depicts a partial front view of the bumper assembly of FIG. 2 according to one or more embodiments described herein;

FIG. 4B depicts a section view of the bumper assembly of FIG. 4A according to one or more embodiments shown or described herein.

DETAILED DESCRIPTION

Vehicles according to the present specification include a bumper assembly including a bumper upper member that is reinforced in a vehicle vertical direction against a bumper energy absorber structure. As will be described herein, the bumper upper member includes a rigidity flange that extends outwardly toward the bumper energy absorber that limits movement of the bumper upper member in response to a downward vertical force, which can improve static subjective rigidity, while maintaining pedestrian performance.

Figure 1:
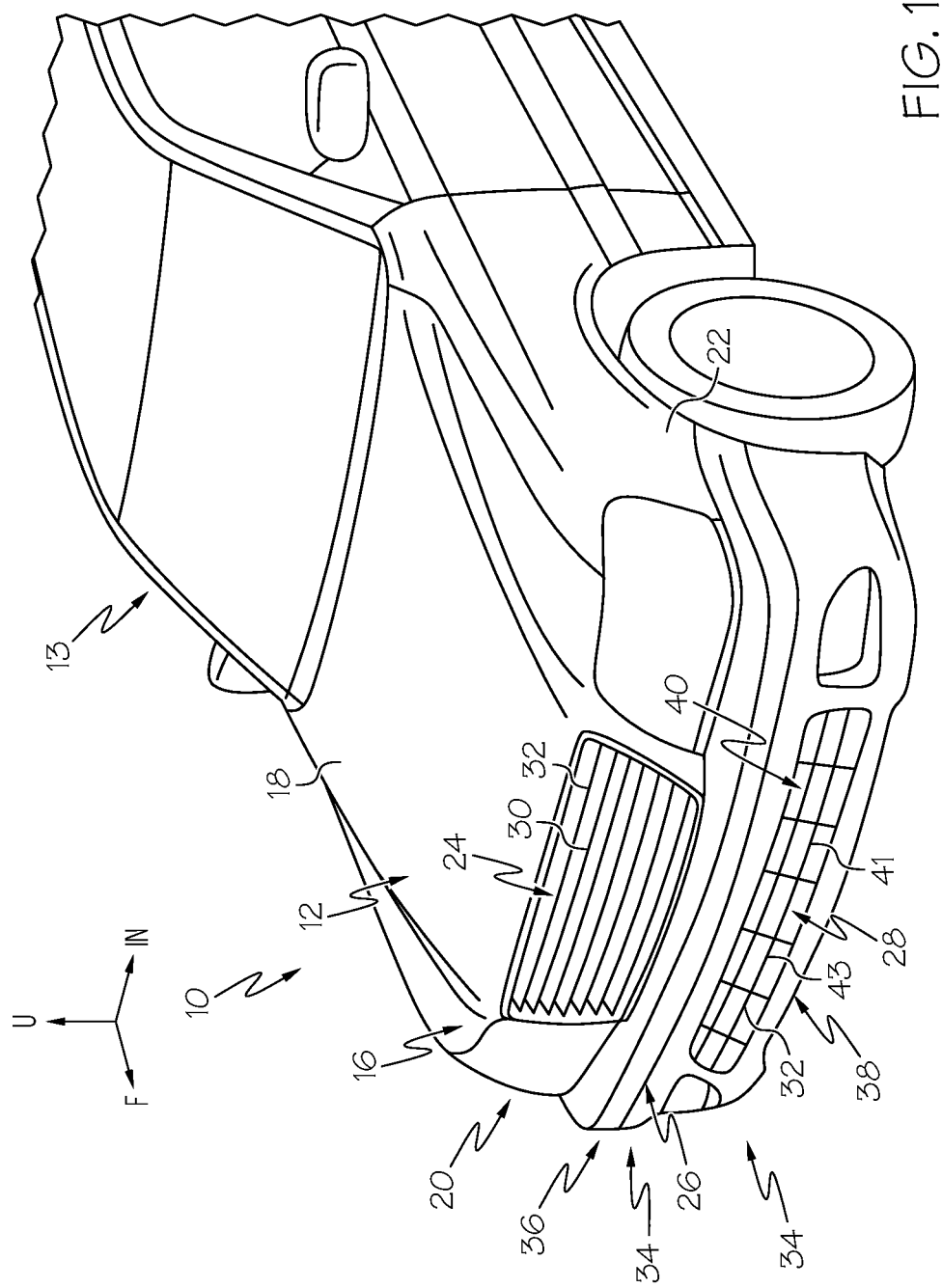
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle F-direction depicted in FIG. 1). The term "vehicle lateral direction" refers to the cross-vehicle direction (i.e., in the +/− vehicle IN-direction depicted in FIG. 1), and is transverse to the vehicle longitudinal direction. The term "vehicle vertical direction" refers to the upward-downward direction of the vehicle (i.e., in the +/− vehicle U-direction depicted in FIG. 1). Further, the terms "inboard" and "outboard" are used to describe the relative positioning of various components of the vehicle with respect to a centerline of the vehicle.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 10 is depicted. The vehicle 10 includes a unibody 12 onto which a vehicle drivetrain is coupled. The vehicle 10 also includes a cabin 13 that is integral with the unibody 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 includes a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or bumper fascia 34, an upper projecting bumper portion 36 and a lower projecting bumper portion 38 that under hangs the upper projecting bumper portion 36. The lower grille assembly 28 may include a covering portion 41 with a number of horizontally disposed grille deflectors 43 and be located between the upper projecting bumper portion 36 and the lower projecting bumper portion 38.

Figure 2:
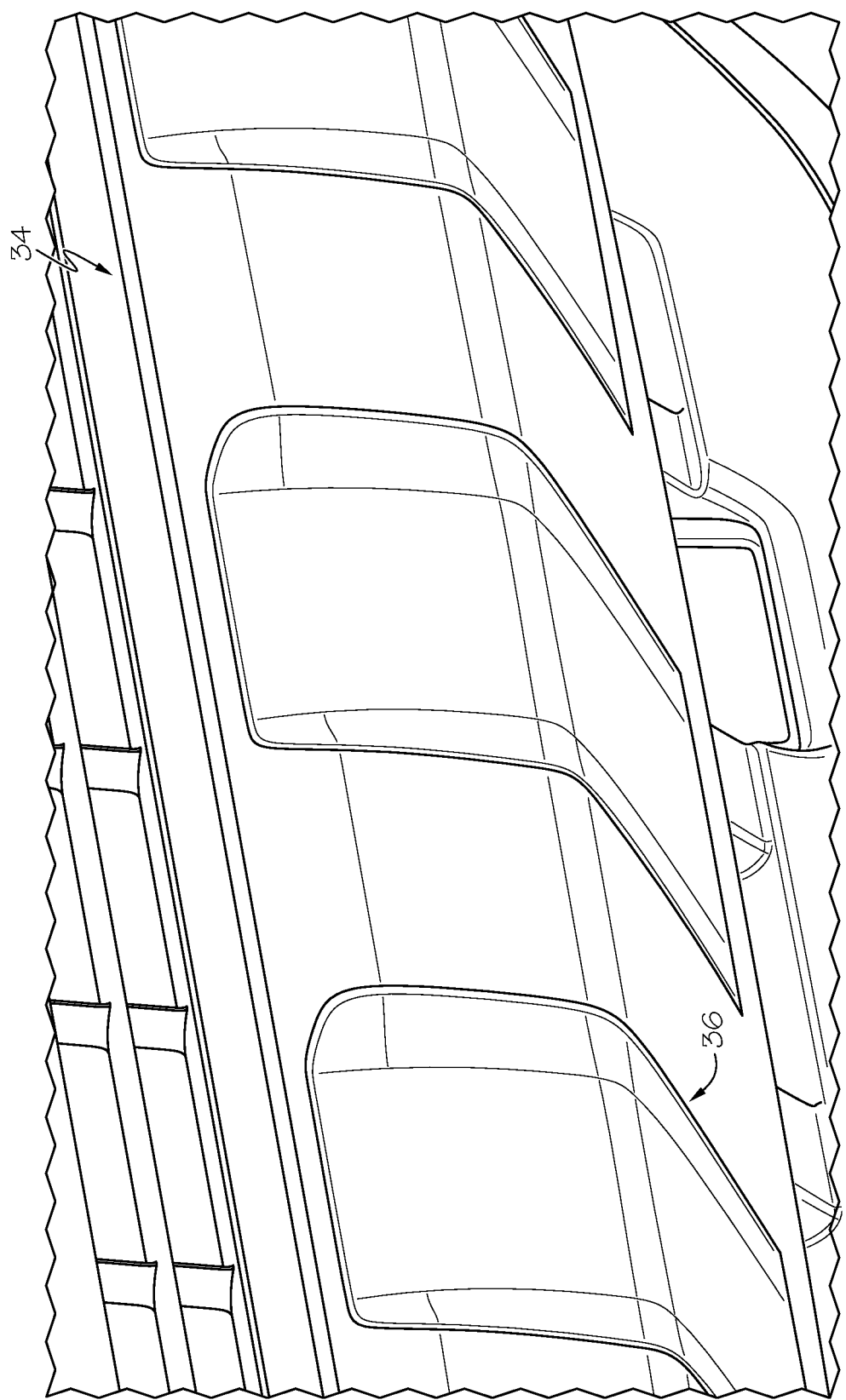
FIG. 2 depicts a front view of a bumper assembly of the vehicle of FIG. 1 according to one or more embodiments shown or described herein.
Figure 3:
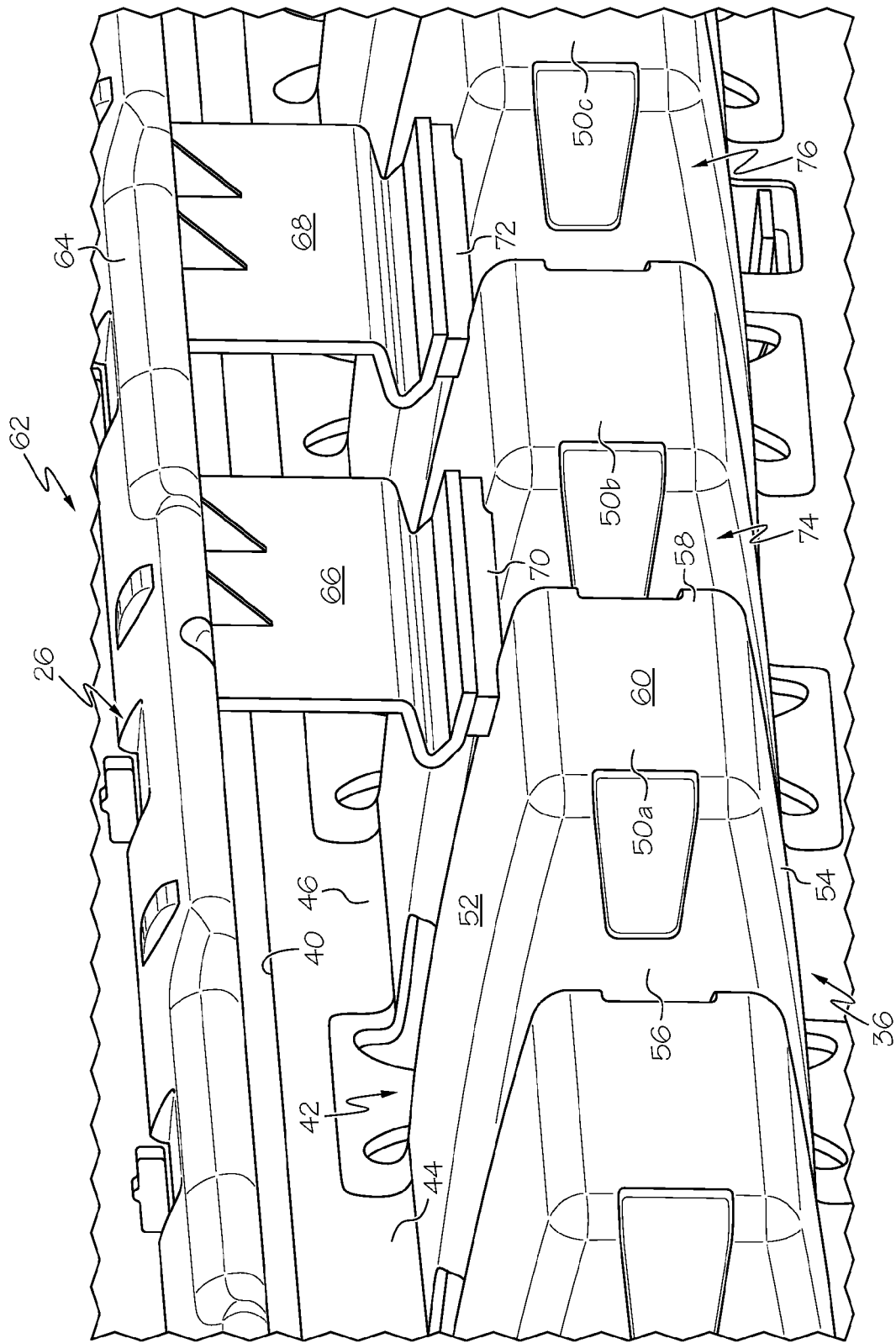
FIG. 3 depicts a front view of the bumper assembly of FIG. 2 with a bumper fascia removed according to one or more embodiments shown or described herein.

Referring to FIGS. 2 and 3, the bumper fascia 34 is an outer covering for covering a bumper reinforcement beam 40 and a bumper energy absorber member 42 that both extend in the vehicle lateral direction between the front fenders 20 and 22 (FIG. 1). The bumper reinforcement beam 40 may generally have a curved shape in the vehicle lateral direction and extend forward in the vehicle longitudinal direction to a front face 44. The bumper fascia 34 also extends forward in the upper projecting bumper portion 36 to cover the bumper reinforcement beam 40 and bumper energy absorber member 42 (FIG. 3). Referring particularly to FIG. 3, a space may be provided between the bumper fascia 34 and the bumper energy absorber member 42. The space can allow for some rearward deformation of the bumper fascia 34 at the upper projecting bumper portion 36 before contacting the bumper energy absorber member 42. In other embodiments, the space may not be provided between the bumper fascia 34 and the bumper energy absorber member 42. For example, the bumper fascia 34 may be connected directly to the bumper energy absorber member 42.

Referring to FIG. 3, the upper bumper projecting portion 36 of the front bumper assembly 26 is illustrated with the bumper fascia 34 removed. The front bumper assembly 26 includes the bumper reinforcement beam 40 with the bumper energy absorber member 42 attached thereto and extending outwardly in the vehicle longitudinal direction. The bumper energy absorber member 42 may be connected to the bumper reinforcement beam 40 by any suitable method, such as fasteners, welding, adhesives, etc. The bumper energy absorber member 42 may generally include a mounting structure or base 46 that extends laterally along a length of the bumper reinforcement beam 40. A set of energy absorbing lobes 50 project outwardly from the base 46 in the vehicle longitudinal direction. Each energy absorbing lobe 50 includes a top 52, a bottom 54, sides 56 and 58 and an end 60 forming a somewhat closed, box-like structure. The energy absorbing lobes 50 are each spaced-apart from each other in the vehicle lateral direction. The bumper energy absorber member 42 may be formed of any suitable material, such as plastic, and be formed by any suitable method, such as molding, machining, etc.

A bumper upper member 62 extends laterally above the bumper energy absorber member 42. The bumper upper member 62 includes upper bumper support 64 that extends laterally along a length of the bumper energy absorber member 42, overhanging the set of energy absorbing lobes 50. Extending outwardly from the bumper upper support 64 toward the energy absorbing lobes 50 are vertical rigidity flanges 66 and 68. In the illustrated embodiment, a pair of vertical rigidity flanges 66 and 68 is illustrated at a center of the upper bumper support 64; however, any number of vertical rigidity flanges may be used, such as more or less than two. The vertical rigidity flanges 66 and 68 extend toward the energy absorbing lobes 50, resting on a protector member 70 and 72. The protector member 70 and 72 may be any suitable material, such as a strip of foam, rubber etc. In some embodiments, the protector member 70 and 72 may be adhered to the vertical rigidity flanges 66 and 68, sandwiched between the vertical rigidity flanges 66 and 68 and energy absorbing lobes 50. In the illustrated embodiment, the vertical rigidity flanges 66 and 68 span gaps 74 and 76 between adjacent energy absorbing lobes 50a, 50b and 50c. In other words, each vertical rigidity flange 66 and 68 may rest on multiple energy absorbing lobes 50. In other embodiments, the vertical rigidity flanges may rest upon a single energy absorbing lobe 50.

Referring to FIGS. 4A and 4B, the vertical rigidity flange (only vertical rigidity flange 66 is shown in FIGS. 4A and 4B) extends downwardly from the upper bumper support 64. In some embodiments, the vertical rigidity flange 66 may be integrally formed with the upper bumper support 64. In other embodiments, the vertical rigidity flange 66 may be formed separately from the upper bumper support 64 and attached thereto. Referring particularly to FIG. 4B, the vertical rigidity flange 66 includes an outwardly extending portion 80 and an inwardly extending portion 82 providing a foot. The inwardly extending portion 82 rests on the protector member 72. An inner rib 84 extends along a height of the vertical rigidity flange 66, between the outwardly extending portion 80 and the inwardly extending portion 82. An outer rib 86 extends between the outwardly extending portion 80 and a vertical wall 88 that extends between the outwardly extending portion 80 and the inwardly extending portion 82.

Figure 5:
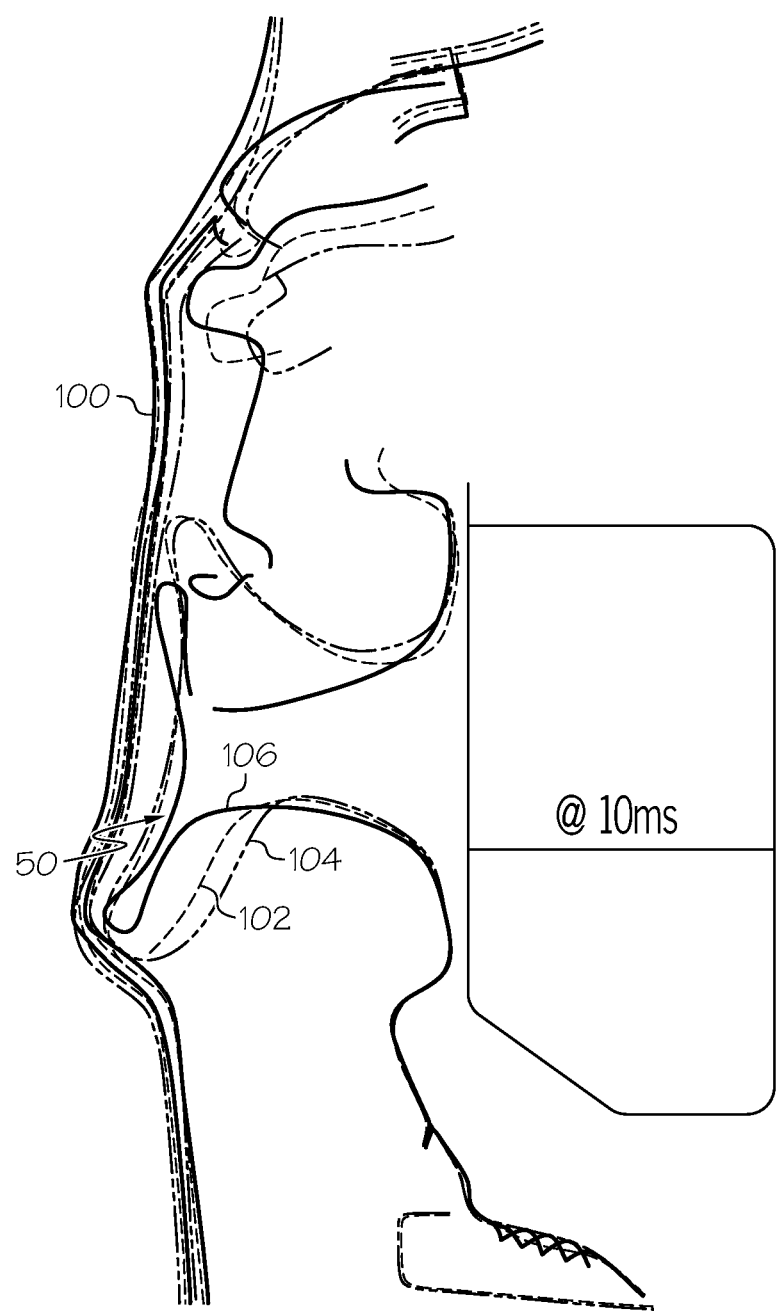
FIG. 5 illustrates a stiffness diagram of a bumper assembly including a bumper upper member that is reinforced in a vehicle vertical direction against a bumper energy absorber structure.

In operation, a force $F_1$ normal to the upper bumper support 64 tends to cause a downward deflection of the upper bumper support 64. The vertical rigidity flanges 66 and 68 resist such movement through support by the energy absorbing lobes 50 and protector members 70 and 72. Because the bumper upper member 62 and bumper energy absorber member 42 are separate components, the vertical rigidity flanges 66 and 68 have a reduced influence on the performance of the energy absorbing lobes 50 in response to a longitudinal force $F_2$. In some embodiments, at least a 30 percent increase in bumper stiffness in the vertical direction can be achieved over other bumper structures without a vertical rigidity flange. FIG. 5 illustrates that the vertical rigidity flanges have a reduced influence on the performance of the energy absorbing lobes 50 by an impact by an impact object 100 where line 102 includes the bumper rigidity flange, line 104 is a base line and line 106 illustrates a higher stiffness configuration.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a bumper assembly comprising:
a bumper reinforcement beam extending generally in a vehicle lateral direction;
a bumper energy absorber member connected to the bumper reinforcement beam and extending outwardly in a vehicle longitudinal direction toward a bumper fascia;
an upper bumper member that extends in the vehicle lateral direction above the bumper energy absorber, the upper bumper member comprising:
an upper bumper support that extends in the vehicle lateral direction along a length of the bumper energy absorber member; and
a vertical rigidity flange extending outwardly from the upper bumper support and spanning a gap between the upper bumper support and bumper energy absorber member, the bumper energy absorber member supporting the vertical rigidity flange in a vehicle vertical direction;
wherein the upper bumper support overhangs the bumper energy absorber member, the vertical rigidity flange extending outwardly from the upper bumper support to rest on the bumper energy absorber.

2. The vehicle of claim 1, wherein the bumper energy absorber member comprises multiple energy absorbing lobes spaced-apart from each other in the vehicle lateral direction.

3. The vehicle of claim 2, wherein the vertical rigidity flange spans a gap between adjacent energy absorbing lobes.

4. The vehicle of claim 1 further comprising a protector member located between the vertical rigidity flange and the bumper energy absorber member.

5. The vehicle of claim 4, wherein the vertical rigidity flange includes an outwardly extending portion at the upper bumper support and an inwardly extending portion providing a foot that rests on the protector member.

6. The vehicle of claim 5, wherein the vertical rigidity flange includes an inner rib that extends along a height of the vertical rigidity flange between the outwardly extending portion and the inwardly extending portion.

7. The vehicle of claim 5, wherein the vertical rigidity flange includes an outer rib that extends between the outwardly extending portion and a vertically extending wall of the vertical rigidity flange.

8. The vehicle of claim 1 comprising multiple vertical rigidity flanges extending outwardly from the upper bumper support and spanning the gap between the upper bumper support and bumper energy absorber member, the bumper energy absorber member supporting the multiple vertical rigidity flanges in the vehicle vertical direction.

9. The vehicle of claim 1, wherein the vertical rigidity flange is formed integrally with the upper bumper support.

10. An upper bumper member that extends in a vehicle lateral direction above a bumper energy absorber, the upper bumper member comprising:
an upper bumper support configured to extend in the vehicle lateral direction along a length of the bumper energy absorber member; and
a vertical rigidity flange extending outwardly from the upper bumper support and configured to span a gap between the upper bumper support and bumper energy absorber member to support the upper bumper support in a vehicle vertical direction on the bumper energy absorber member;
wherein the upper bumper support is configured to overhang the bumper energy absorber member, the vertical rigidity flange is configured to extend outwardly from the upper bumper support to rest on the bumper energy absorber.

11. The upper bumper member of claim 10, wherein the vertical rigidity flange includes an outwardly extending portion at the upper bumper support and an inwardly extending portion providing a foot.

12. The upper bumper member of claim 11, wherein the vertical rigidity flange includes an inner rib that extends along a height of the vertical rigidity flange between the outwardly extending portion and the inwardly extending portion.

13. The upper bumper member of claim 12, wherein the vertical rigidity flange includes an outer rib that extends between the outwardly extending portion and a vertically extending wall of the vertical rigidity flange.

14. The upper bumper member of claim 10 comprising multiple vertical rigidity flanges extending outwardly from the upper bumper support and configured to span the gap between the upper bumper support and bumper energy absorber member.

15. The upper bumper member of claim 10, wherein the vertical rigidity flange is formed integrally with the upper bumper support.

16. A method of providing bumper rigidity comprising:
providing an upper bumper member that extends in the vehicle lateral direction above a bumper energy absorber, the upper bumper member comprising:
an upper bumper support that extends in the vehicle lateral direction along a length of the bumper energy absorber member; and
a vertical rigidity flange extending outwardly from the upper bumper support and spanning a gap between the upper bumper support and bumper energy absorber member, the bumper energy absorber member; and
supporting the vertical rigidity flange on the bumper energy absorber member in a vehicle vertical direction;
wherein the upper bumper support overhanging the bumper energy absorber member, the vertical rigidity flange extending outwardly from the upper bumper support resting on the bumper energy absorber.

17. The method of claim 16, wherein the bumper energy absorber member comprises multiple energy absorbing lobes spaced-apart from each other in the vehicle lateral direction and wherein the vertical rigidity flange spans a gap between adjacent energy absorbing lobes.

18. The method of claim 16 further comprising providing a protector member between the vertical rigidity flange and the bumper energy absorber member.

19. The method of claim 18, wherein the vertical rigidity flange includes an outwardly extending portion at the upper bumper support and an inwardly extending portion providing a foot that rests on the protector member.

20. The method of claim 16 comprising multiple vertical rigidity flanges extending outwardly from the upper bumper support and spanning the gap between the upper bumper support and bumper energy absorber member, the bumper energy absorber member supporting the multiple vertical rigidity flanges in the vehicle vertical direction.

* * * * *